(12) United States Patent
Sollami (10) Patent No.: US 7,770,287 B1
(45) Date of Patent: Aug. 10, 2010

(54) MACHINE FOR ALIGNING AND ASSEMBLING A TOOL

(75) Inventor: Phillip A. Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 1189 days.

(21) Appl. No.: 11/370,685

(22) Filed: Mar. 8, 2006

(51) Int. Cl.
 *B23P 19/00* (2006.01)
 *B23P 19/02* (2006.01)
 *B23P 19/10* (2006.01)

(52) U.S. Cl. .................. 29/700; 29/407.09; 29/407.1; 29/235; 29/244; 29/281.1; 29/282

(58) Field of Classification Search .................. 29/525, 29/700, 798, 235, 244, 281.1, 281.3, 282, 29/284, 407.09, 407.1
See application file for complete search history.

(56) References Cited

U.S. PATENT DOCUMENTS

| 2005/0210671 A1* | 9/2005 | Itoh | 29/801 |
| 2007/0137019 A1* | 6/2007 | Williamson | 29/525 |

\* cited by examiner

*Primary Examiner*—Jermie E Cozart
(74) *Attorney, Agent, or Firm*—Robert L. Marsh (57) ABSTRACT

An assembly machine for assembling a rotatable tool has a frame with a base. A retainer on the base holds a blank tool body with the cylindrical shank thereof extending upwardly. A motor assembly at the upper end of the frame moves a cylindrical assembly member axially downwardly and a tubular lower end of the assembly member forces as annular wear ring around a compressible sleeve on the shank of the tool.

18 Claims, 10 Drawing Sheets

MACHINE FOR ALIGNING AND ASSEMBLING A TOOL

The present invention relates to a machine for assembling a rotatable tool, where the rotatable tool includes a tool body with a cylindrical shank, a compressible sleeve with a longitudinal slot therein fitted around the shank, and a wear washer with an inwardly directed projection fitted on the shank with the projection aligned with the slot of the sleeve.

BACKGROUND OF THE INVENTION

Rotatable tools having hardened cutting tips are used on road planing machines, excavating machines, and the like. A typical road planing machine may receive several hundred tools all of which must be replaced at least once a day while the machine is in use. As a result, a great number of rotatable tools are used by such machines. Accordingly, there is a demand for rotatable tools that have an extendable useful life and that are easily replaced into the tool holders of the machine. In my patent application Ser. No. 10/952,158, I disclosed a rotatable tool having a non-rotatable wear washer. The tool disclosed in this application has a metal body with a tapered forward cutting end and a cylindrical shank extending axially rearward of the forward cutting end. Fitted around the shank is a sleeve having a longitudinal slot therein so as to be compressible. The tool also includes a wear washer having a central opening that is fitted around the shank of the tool in the forward end of the sleeve. A projection extends radially inwardly of the central opening and engages surfaces of the sleeve so as to prevent the wear washer from rotation with the tool body once the tool is mounted into the tool holder of the machine.

An important part of the tool disclosed in my patent application Ser. No. 10/952,158 is that the tool is sold with the wear washer positioned around the central portion of the compressible sleeve with the inwardly directed projection compressing the sleeve into a diameter less than the inner diameter of the bore of the tool holder into which the shank of the tool is to be fitted. With the sleeve compressed around the shank, the distal end of the tool is easily inserted into the bore of the tool holder thereby greatly facilitating the insertion of a replacement tool. To operate properly, the wear ring must be assembled around the sleeve of the tool with the inwardly directed tab positioned across the parallel edges of the elongate slot in the sleeve.

The tool disclosed in my patent application Ser. No. 10/952,158 greatly reduces the difficulty of inserting a replacement tool into a tool holder, and therefore there is a great need for the tool disclosed in this application. It is necessary, therefore, to provide a machine that will assemble the parts of the tool with the parts properly aligned so that the sleeve can be compressed with the wear washer wrapped around the central portion thereof and the tab of the wear washer aligned across the parallel ends of the sleeve.

SUMMARY OF THE INVENTION

Briefly, the present invention is embodied in a machine that will assemble a wear washer around a midportion of a compressible sleeve having an elongate slot therein defined by parallel edges and the wear washer has a radially inwardly directed projection that is aligned across the parallel edges of the slot. The machine includes a frame having a holder that retains the tapered forward end of the tool with the shank of the tool extending upwardly. The machine includes a vertically moveable assembly having a tubular pusher member at the lower end, the tubular pusher member having an inner diameter greater than the outer diameter of the shank, and the tubular pusher member is retained by the frame with its longitudinal axis coaxial with the longitudinal axis of the shank of the tool held in the retainer.

The machine includes an axial driving device or motor such as an air or hydraulic cylinder at the top of the frame that urges the assembly, including the tubular pusher member downwardly or upwardly thereby moving it toward or away from the shank of a tool retained in the holder. When the machine is used to assemble a wear washer over a retainer sleeve of the tool, a wear washer is positioned around the distal end of the shank while the tubular pusher member is elevated and spaced from the distal end of the shank. Then, as the motor moves the tubular pusher member downward and around the distal end of the shank, the central opening of the wear washer is pushed around the compressible sleeve.

The machine also includes a pair of opposing clamping members that are radially moveable against opposite portions of the outer surface of the compressible sleeve for compressing the sleeve around the shank prior to the tubular pusher member urging the wear washer around the sleeve. With the sleeve compressed by the clamping members around the shank, the tubular pusher member of the assembly member can urge the wear washer axially into its position around the midsection of the sleeve without causing damage to the parts of the tool or to the machine.

Each of the two opposing clamping members is mounted on a pivot arm. The tubular pusher member also has a cam surface. Rollers on the pivot arms engage the cam surface of the tubular pusher member and the movement of the rollers as they follow the cam surface urges the clamping surfaces of the clamping members toward each other.

The machine further includes an alignment prong moveably mounted on the frame. The alignment prong having a width at the outer end that is less than the spacing between the outer edges of the slot while the slot is in the uncompressed condition. The alignment prong is moveable between a first position where the end portion thereof is positioned between outer edges of a sleeve fitted around the shank of a tool seated in the holder and a second position in which the end portion is spaced from the outer edges.

The wear washer has an outer surface that is noncylindrical and the noncylindrical portion is indexed with respect to the inwardly directed tab such that aligning the noncylindrical portion with a complementary surface on the machine aligns the tab with respect to the sleeve. A fixture on the frame of the machine includes an alignment surface for engaging the noncylindrical portion of the wear washer for aligning the wear washer with respect to the fixture and thereby aligning the inwardly directed projection with respect to the parallel sides of the elongate slot. Accordingly, as the tubular pusher member of the assembly member forces the wear washer over the sleeve, the inwardly directed projection will be properly aligned with respect to the parallel edges of the slot.

BRIEF DESCRIPTION OF THE DRAWINGS

A better understanding of the invention will be had after a reading of the following detailed description taken in conjunction with the drawings wherein.

DETAILED DESCRIPTION OF PREFERRED EMBODIMENT

Figures 1, 2:
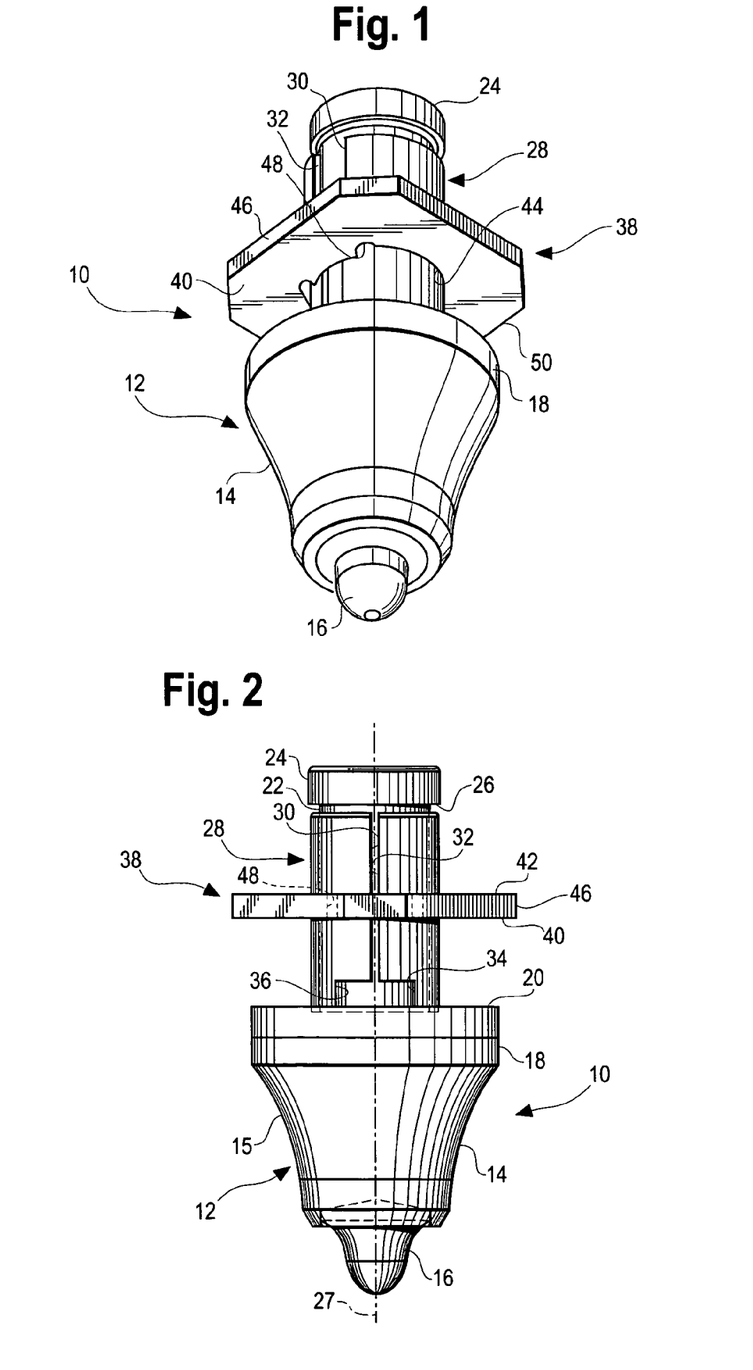
FIG. 1 is an isometric view of a tool assembled by the machine of the present invention.
FIG. 2 is a side elevational view of the tool shown in FIG. 1.

Referring to FIGS. 1 and 2, a tool 10 for use in a cutting machine, not shown, has a tool body 12 with a tapered forward cutting end 14 at the forward end of which is a seat into which is brazed a hardened cutting tip 16. The tapered cutting end 14 flares outward towards its rearward end to a flange 18 having a generally planar annular rearward surface 20. Extending axially rearward from the center of the annular rearward surface 20 is a cylindrical shank 22 having an enlarged hub 24 at the distal end that forms an annular shoulder 26 with the central portion of the shank 22. The parts of the tool body 12 are symmetrical about a longitudinal axis 27.

Fitted around the shank 22 of the tool body 12 is a sleeve 28 having a longitudinal slot forming a pair of spaced apart parallel edges 30, 32. The sleeve 28 is fitted around the shank 22 with the forward end of the sleeve 28 abutting against the planar annular surface 20 and the rearward portion of the sleeve 28 can abut against the shoulder 26. At the forward end of the parallel edges 30, 32 are cutout portions 34, 36.

Fitted around the sleeve 28 is a annular wear washer 38 having planar upper and lower surfaces 40, 42, a generally cylindrical central opening 44, and a generally cylindrical outer surface 46. Extending radially inwardly of the central opening 44 is a projection 48 and a flat 50 is positioned on the outer surface 46 thereof with the flat 50 aligned directly opposite the projection 48. When the tool 10 is assembled for sale, the sleeve 28 is positioned around the shank 22 with the sleeve compressed such that the parallel edges 30, 32 are in close proximity to each other. The sleeve 28 is retained in the compressed condition by the wear washer 38 which is fitted around the central portion of the sleeve with the projection 48 extending across the outer edges 30, 32.

Figure 3:
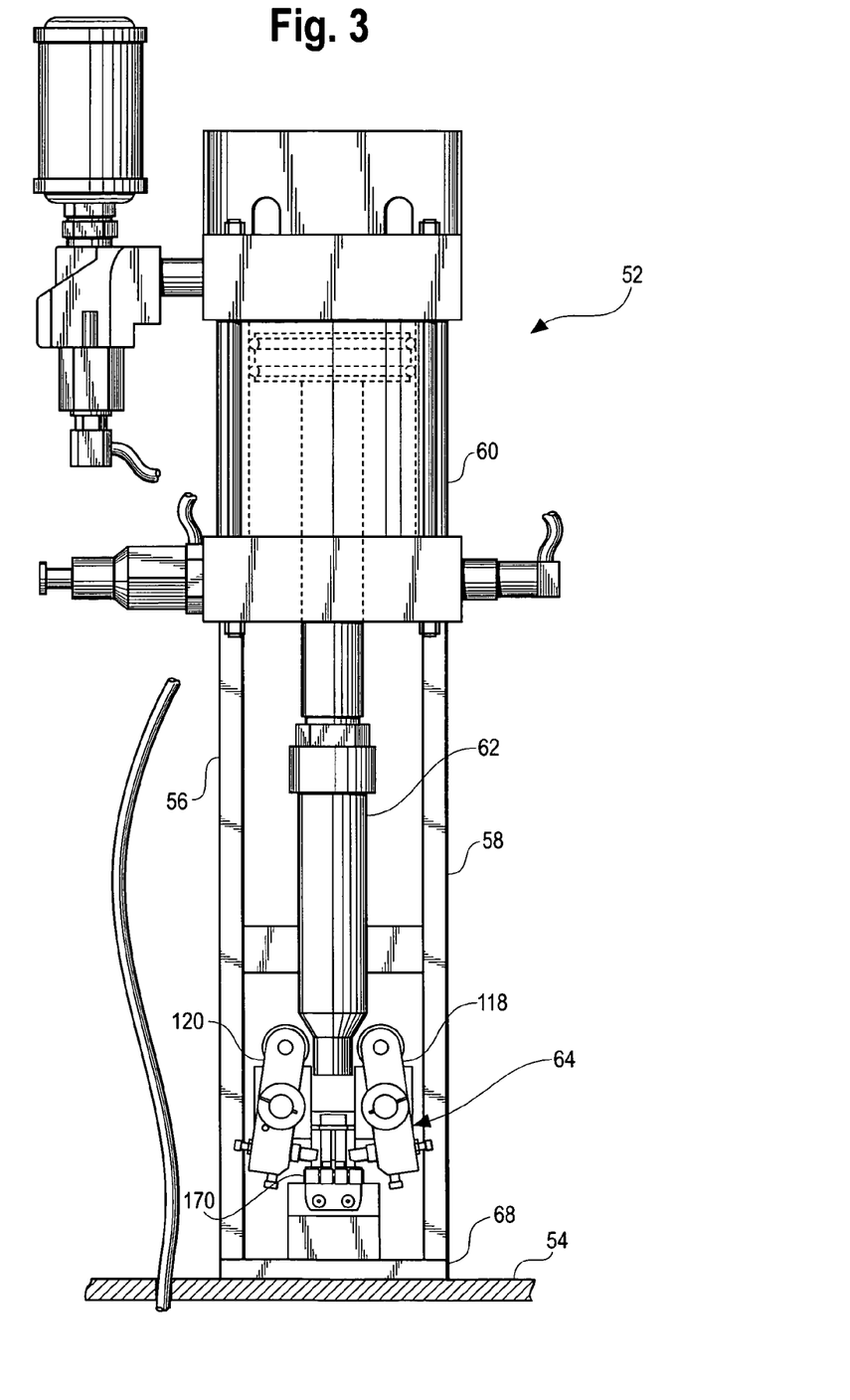
FIG. 3 is a front elevational view of a machine in accordance with the present invention that assembles the tool shown in FIGS. 1 and 2.
Figure 4:
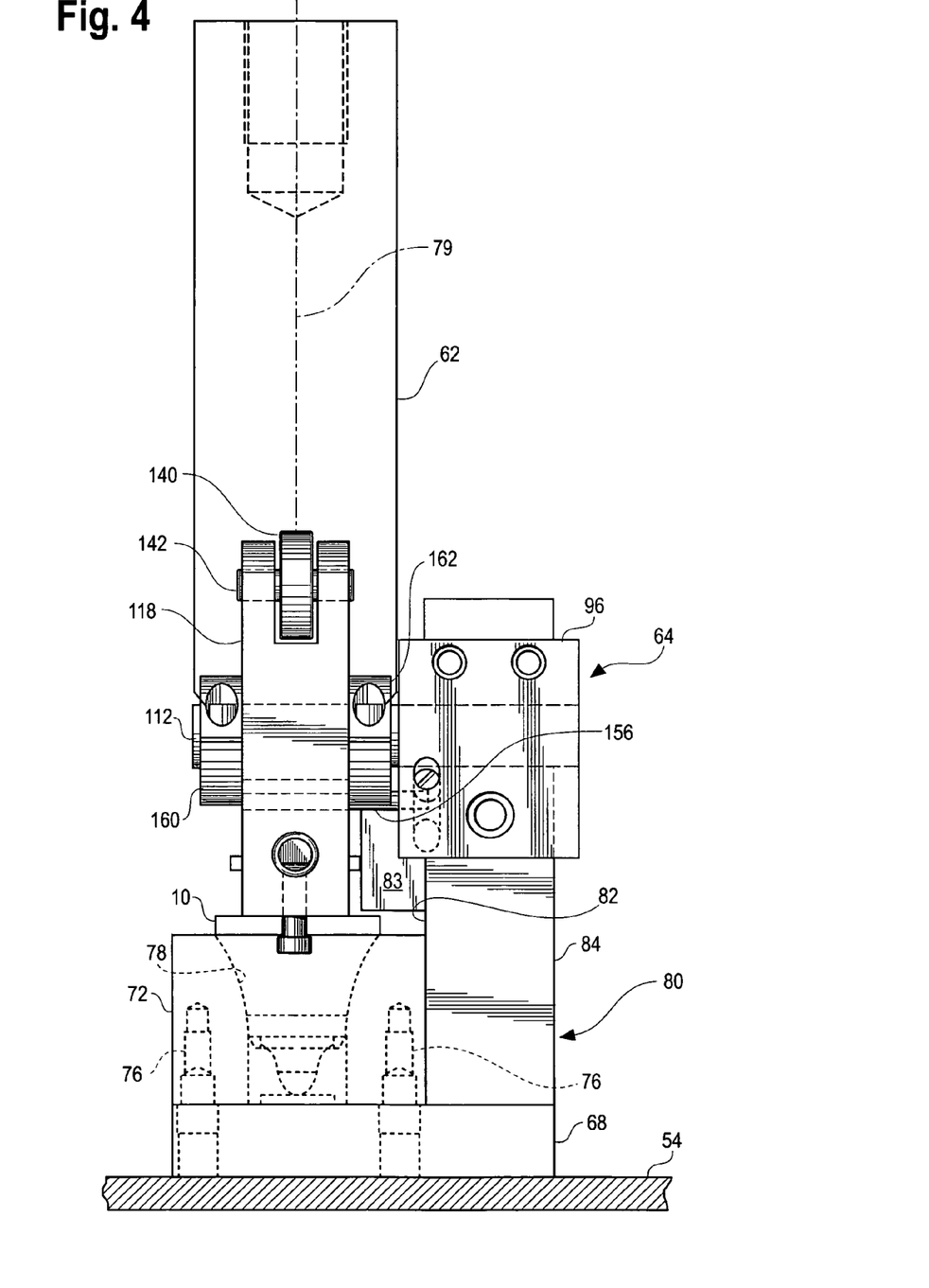
FIG. 4 is a side elevational view of the machine shown in FIG. 3.
Figure 5:
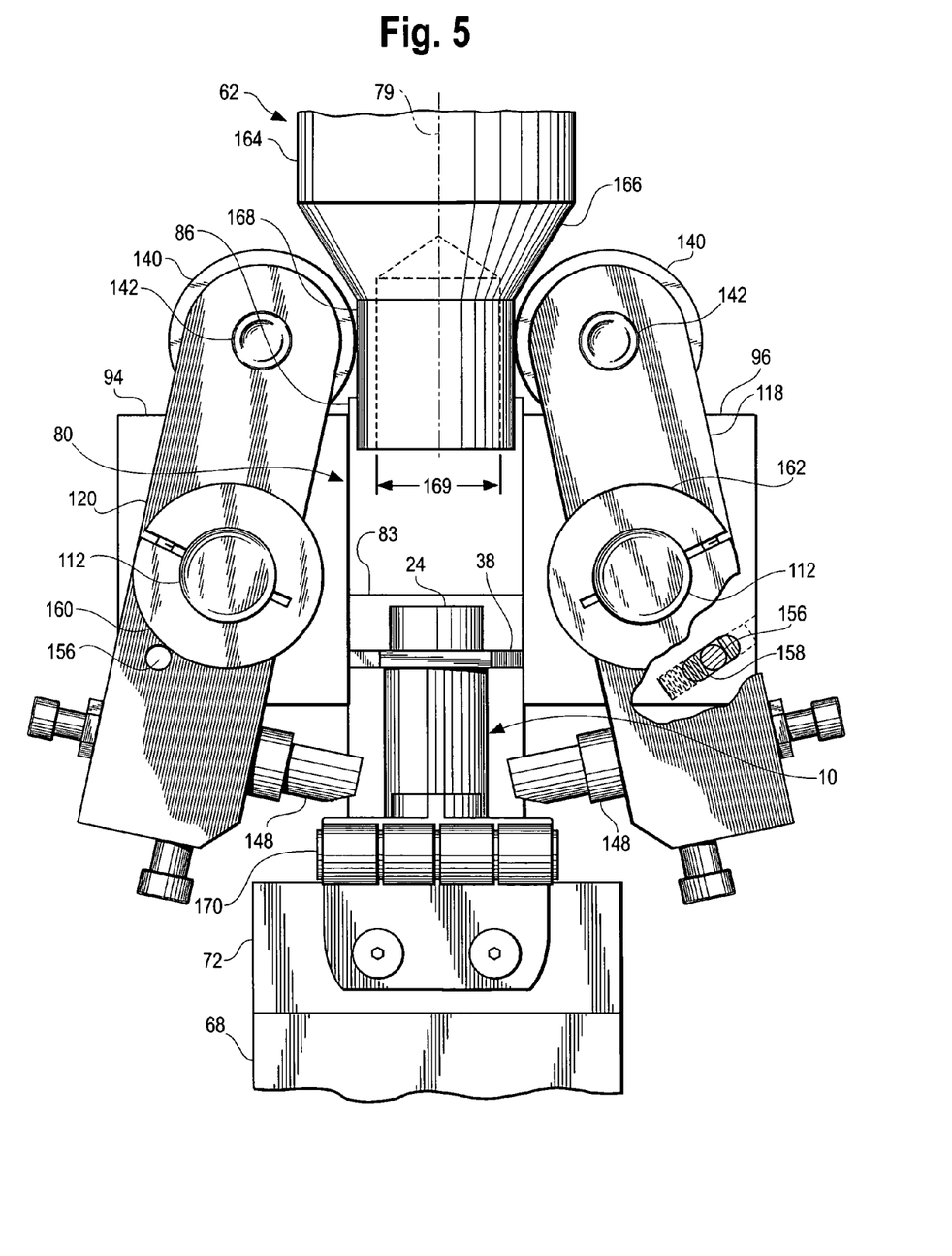
FIG. 5 is a fragmentary enlarged front elevational view of the machine shown in FIG. 3 with the assembler ready to assemble the tool shown in FIG. 1.

Referring to FIGS. 3, 4, and 5, to assemble the wear washer 38 onto the sleeve 28 with the projection 48 properly aligned with respect to the parallel edges 30, 32, a machine 52 is provided. The machine 52 is mounted on a solid surface such as a tabletop 54 and has opposing parallel vertically standing upright members 56, 58 at the upper end of which is a pneumatic cylinder 60 with associated valves, not shown, for pushing an elongate, generally cylindrical tubular pusher member 62. The cylinder 60 pushes the tubular pusher member 62 downwardly, to assemble the parts together, or upwardly, to withdraw the tubular pusher member 62 to allow an assembled first tool 10 to be removed and the unassembled parts of a second tool to be inserted as further described below.

Positioned between the upright members 56, 58 is an assembler 64. The assembler 64 has an enlarged base 68 with a plurality of blind tapped holes extending upwardly into the lower surface thereof for receiving a corresponding plurality of mounting bolts, not shown, for mounting the base 68. In the preferred embodiment, the base 68 and the uprights 56, 58 are firmly secured to each other and to the table top 54 by suitable mounting bolts, not shown.

Positioned immediately above the base 68 is a holder 72. The lower portion of the holder 72 is sized and shaped complementary to the upper surface of the base 68 and is retained thereto by a plurality of bolts 76. The upper surface 78 of the holder 72 is complementary in shape to the forward cutting end 14 of the tool 10 such that the upper surface 78 will retain the tool 10 with the forward cutting end directed downwardly and the shank 22 thereof extending vertically upward. The base 68 and the holder 72 are positioned immediately below the tubular pusher member 62 such that the axis 79 of the tubular pusher member 62 is longitudinally aligned with the axis 27 of the tool 10 retained in the holder 72.

The assembler 64 further includes a stand 80 that extends upwardly from the rear side of the base 68 and spaced from the axis 27 of the tool 10 so as not to interfere with the downward movement of the tubular pusher member 62. The stand 80 has a forward surface 82 oriented behind the holder 72 and the vertical actuator 62, a rearward surface 84 opposite the forward surface 82 and opposing side surfaces 86, 88. Attached to the opposing side surfaces 86, 88 by bolts, not shown, are a pair of opposing mounting blocks 94, 96.

Figure 6:
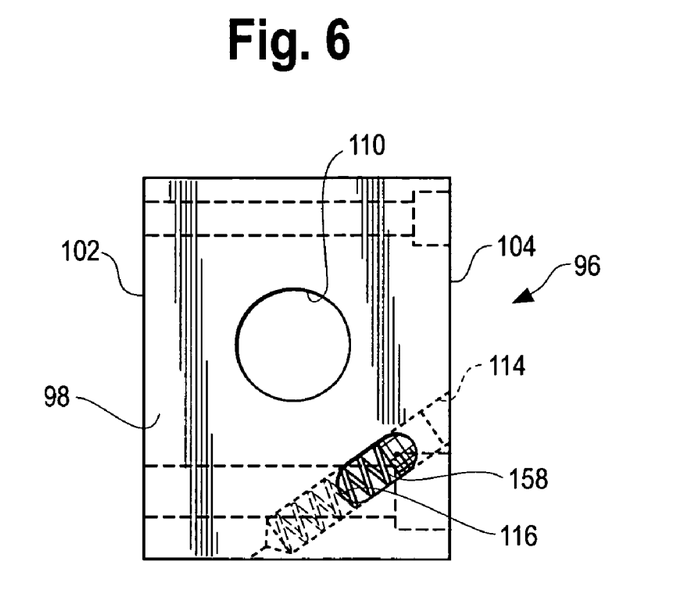
FIG. 6 is an enlarged front elevational view of a mounting block on the machine shown in FIG. 3 with the inner portions thereof shown in broken lines.
Figure 7:
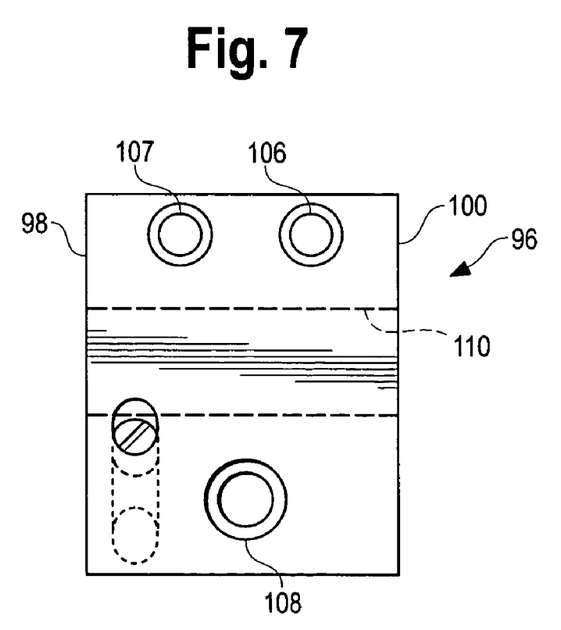
FIG. 7 is a side elevational view of the mounting block shown in FIG. 6 with the inner portions thereof again shown in broken lines.

Referring to FIGS. 5, 6, and 7, each of the mounting blocks, of which block 96 shown in FIGS. 6 and 7 is representative of both, has a forward surface 98, a rearward surface 100, and opposing parallel side surfaces 102, 104. A plurality of transverse holes 106, 107, 108 extend through the opposing side surfaces 102, 104 and are positioned so as to align with the tapped holes, not shown, on opposite side surfaces 86, 88 of the stand 80. Bolts, also not shown, are fitted through the aligned holes 106, 107, 108 of the mounting block 96 and into the tapped holes of the stand 80 to retain the block 96 to the stand 80. Extending transversely from the rearward surface to the forward surface of each of the mounting blocks 94, 96 is a through hole 110 for tightly receiving a dowel pin 112, best seen in FIG. 5. The two dowel pins 112 extend horizontally, one from each of the mounting blocks 94, 96 and on opposite sides of the shaft of the tubular pusher member 62 as it moves upwardly and downwardly toward the base 68 and are spaced from the tubular pusher member 62 so as not to interfere with its movement. Each of the mounting blocks 94, 96 further has an angled hole 114 extending from the outer side surface 104 parallel to the forward surface 98, and radially positioned to a radius of the transverse hole 110 into which the dowel pin 112 is fitted. As best seen in FIG. 7, the angled blind hole 114 is positioned very near the forward surface 98 and an elongate slot 116 extends through the forward surface 98 and opens into a portion of the length of the hole 114.

Figure 8:
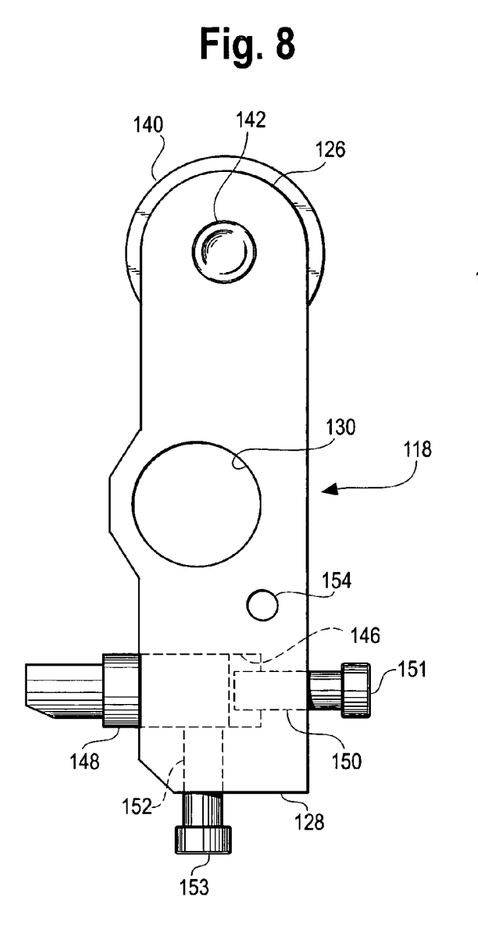
FIG. 8 is a front elevational view of a pivot arm on the machine shown in FIG. 3.
Figure 9:
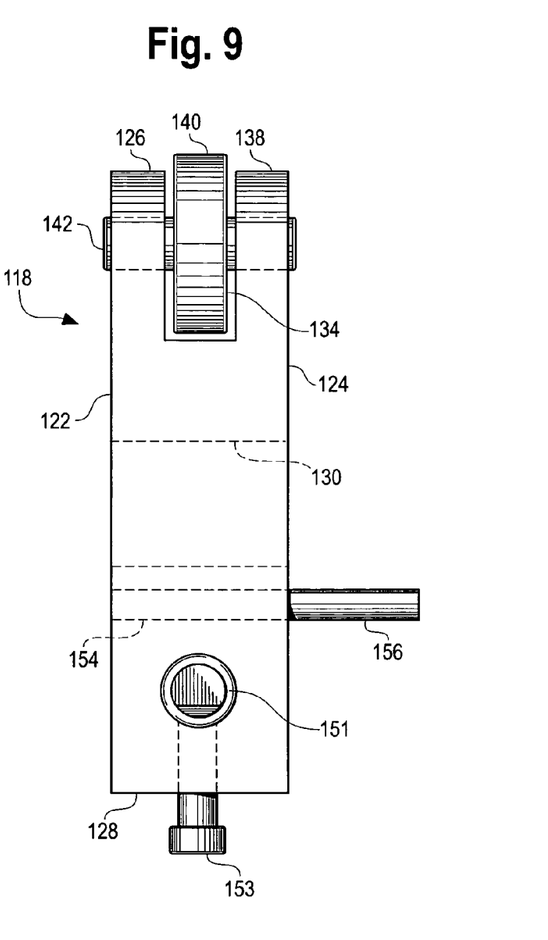
FIG. 9 is a side elevational view of the pivot arm shown in FIG. 8 with the inner portions thereof shown in broken lines.

Referring to FIGS. 5, 8, and 9, rotatably mounted on each of the dowel pins 112 is a pivot arm 118, 120 which are mirror images of one another such that pivot arm 118, as shown in FIGS. 8 and 9 is representative of both. Each of the pivot arms 118 has broad planar side surfaces 122, 124, a roller end 126, and a retainer end 128. Extending through the midsection of the pivot arm 118 is a through hole 130 that is a little larger in diameter than the diameter of the dowel pin 112 such that the dowel pin 112 can be fit through the hole 130 and is pivotable thereon.

As best shown in FIG. 9, extending into one end 126 of the pivot arm 118 is an axial slot 134 forming parallel opposing side members 136, 138. Fitted into the slot 134 is a roller 140 that rotates on a shaft 142 the ends of which extend through opposing holes, unnumbered, in each of the parallel side portions 136, 138 that define the slot 134. As best shown in FIG. 5, the rollers 140 engage the opposing portions of the outer surface of the tubular pusher member 62. The outer surface of the tubular pusher member is a cam and the rollers 140 are followers that engage the cam surface for rotating the pivot arms 118 as is further described below. A pair of split collars 160, 162 are fitted on each side of each of the pivot arms 118, 120 to retain the pivot arms at the desired spacing along the dowel pins 112.

Referring further to FIGS. 7, 8 and 9, the retainer end 128 of the pivot arm 118 has a blind hole 146 therein that is perpendicular to the axis of the through hole 130 into which the dowel pin 112 is received, and fitted into the hole 146 is a clamping pin 148. A small tapped hole 150 at the bottom end of the blind hole 146 receives a set screw, 151, for axially adjusting the position of the clamping pin 148 within the hole 146 and a second tapped hole 152 in the outer surface of the retaining end 128 receives a second locking screw, 153, for tightening against a planar surface on the clamping pin 148 for holding it in its desired rotational orientation within the hole 146.

Each of the pivot arms 118, 120 has a third transverse hole 154 the axis of which is parallel to the axis of the transverse hole 130, the third hole 154 being positioned near the retainer end 128 and spaced about midway between the through hole 130 and the blind hole 146. Through hole 154 receives one end of a roll pin 156, the opposite end of which extends in to the slot 116 of the associated mounting block 96 with the distal end of the roll pin 156 extending into the angled bore 114. A spring 158 is fitted at the bottom of the angled bore 114 such that one end of the spring abuts against the distal end of the bore 114 and the opposite end of the spring 158 engages the distal end of the roll pin 156 for urging the retainer end 128 of the pivot arm outward, or away from the path of the tubular pusher member 62. Since the pivot arm 118 pivots around the dowel pin 112, the spring 158 urges the roller 140 against the cam surface 166 of the tubular pusher member 62.

Figure 10:
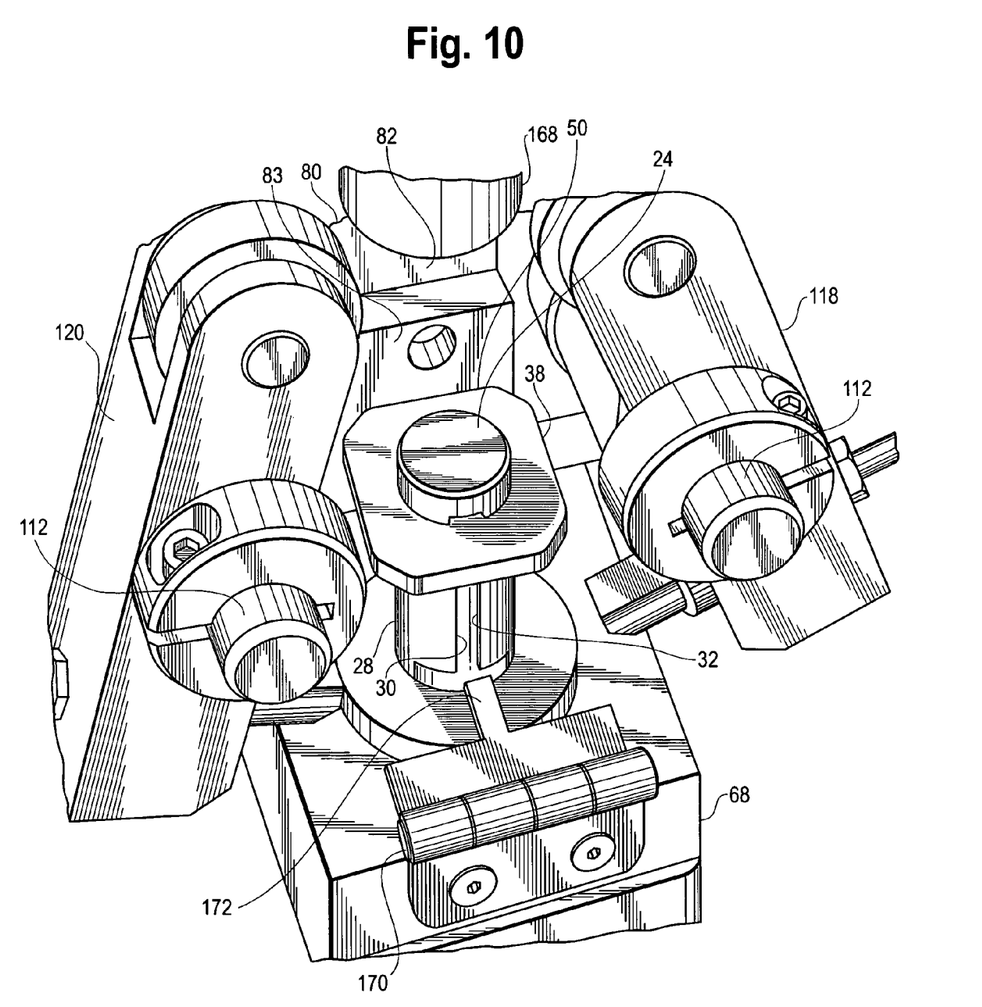
FIG. 10 is a fragmentary isometric view of the machine shown in FIG. 1 aligned and ready to be assembled.

Referring to FIGS. 3 and 10, pivotally attached to the holder 72 by a hinge 170 is an alignment tab 172 having an outer end the width of which is a little narrower than the spacing between the edges 30, 32 of an unstressed sleeve 28. By positioning the distal end of the alignment tab 172 between the slot edges 30, 32 of a sleeve 28, the sleeve 28 can be oriented with respect to the machine 52.

Referring to FIGS. 5 and 10 to 13, the tubular pusher member 62 has a generally cylindrical central body 164, and below the cylindrical central body is a tapered portion 166 and at the lower end of the tubular pusher member 62 is a narrower diameter tubular sleeve 168, the inner diameter 169 of which is a little larger than the diameter of the hub 24 at the distal end of the shank 22 of a tool 10. As shown in FIGS. 5 and 10, when the tubular pusher member 62 is in the elevated position, the springs 158 will urge the rollers 140 on each of the pivot arms 118, 120 against the narrower diameter sleeve 168 of the tubular pusher member 62 thereby forcing the retainer ends 128 of each of the pivot arms 118, 120 out-wardly. With the retainer ends 128 oriented outwardly and the tubular pusher member 62 in the elevated position, an assembled tool 10 can be removed from the holder 72.

Once the assembled tool 10 has been removed, an unassembled tool body 12 with a sleeve 28 fitted around the shank 22 can be inserted with the forward end directed downwardly into the upper surface 78 of the holder 72. The alignment tab 172 is then used to align the slot edges 30, 32 of the sleeve 28 and thereafter, a wear washer 38 can be fitted with the central opening 44 around the circumference of the hub 24 of the tool body 12 with the flat 50 aligned against the outer surface of an alignment plate on the forward surface 82 of the stand 80. With the wear washer 38 so positioned, the inwardly directed projection 48 will be aligned to extend across the slot edges 30, 32 of the sleeve 28. The alignment tab 172 is then removed by rotating it around the hinge 170. The motor, in the form of a pneumatic cylinder 60, is then actuated, urging the tubular pusher member 62 downwardly.

Figure 11:
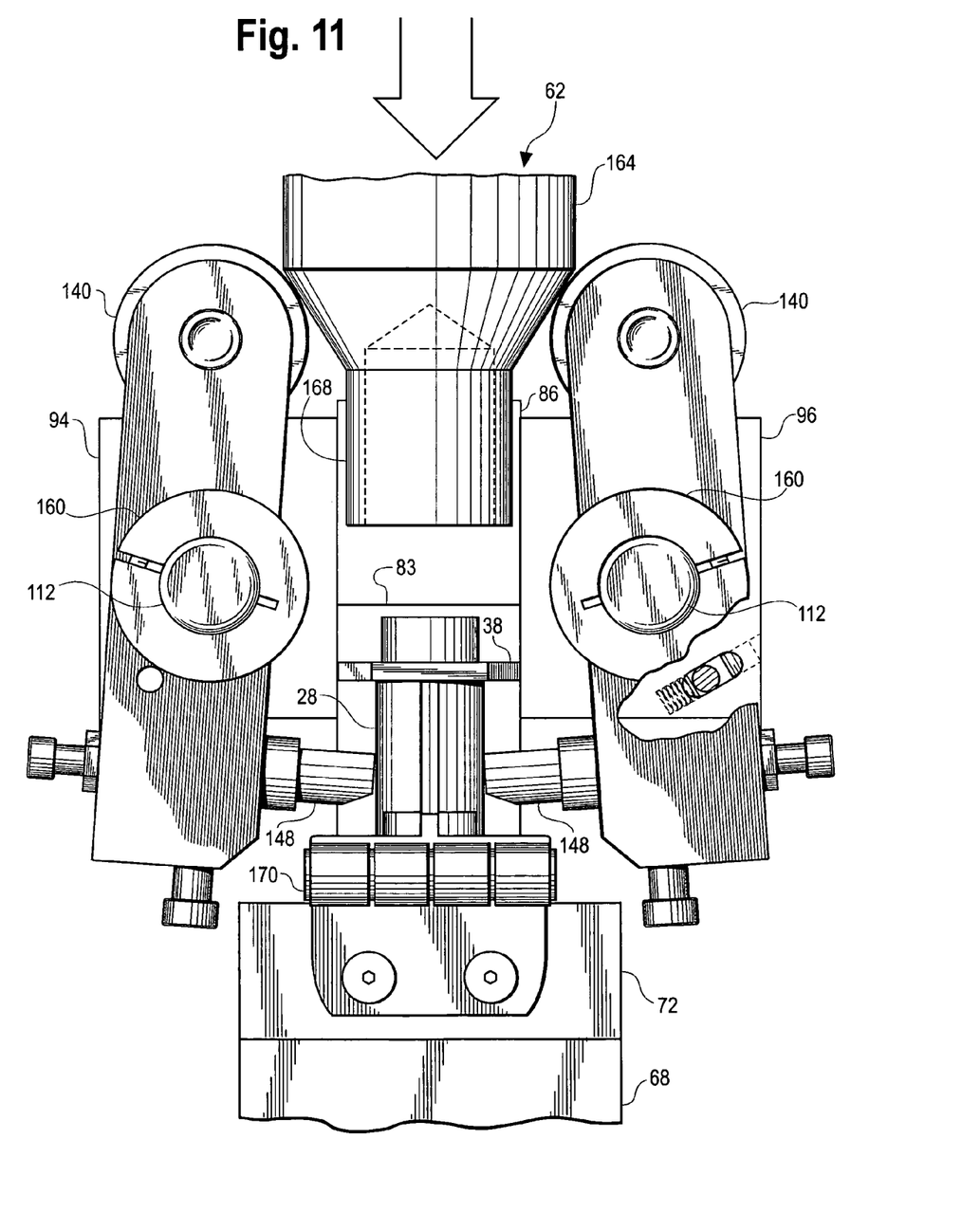
FIG. 11 is a fragmentary front view of the machine shown in FIG. 3 with the clamping pins against the outer wall of the retaining sleeve.
Figure 12:
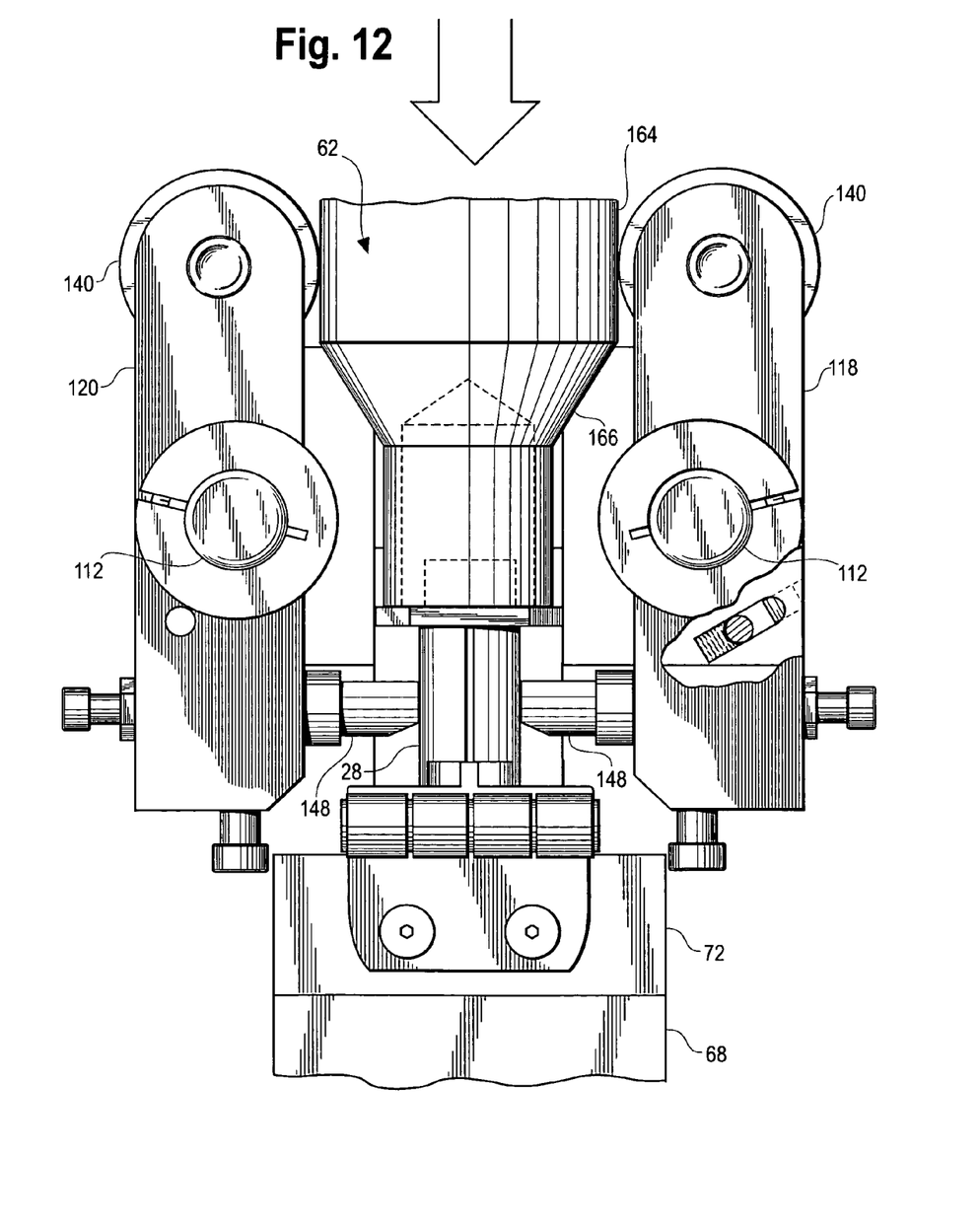
FIG. 12 is another fragmentary front view of the machine shown in FIG. 3, but this time showing the sleeve compressed by the clamping pins.
Figure 13:
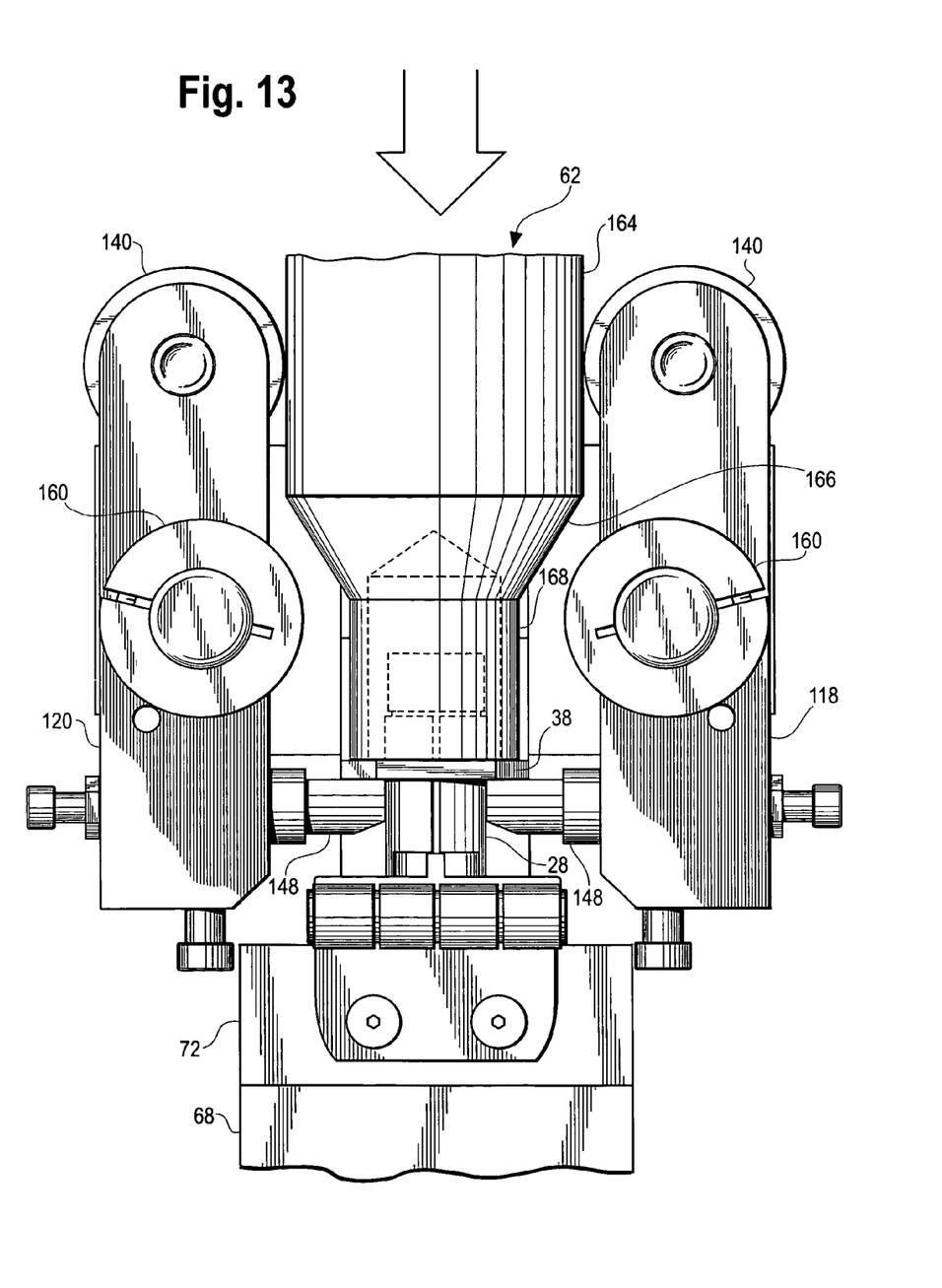
FIG. 13 is another fragmentary front view of the machine shown in FIG. 3, this time showing the tubular pusher member moved downward until the tool has been fully assembled.

As the tubular pusher member 62 moves downwardly, the rollers 140 will move outwardly along the diverging surfaces of the tapered portion 166, as shown in FIG. 11, causing the clamping pins 148 in the retainer end 128 of each of the pivot arms 118, 120 to move toward each other until they abut against the outer surface of the sleeve 28 and compress the sleeve 28 around the shank 22 of the tool body 12. Continued downward movement of the tubular pusher member 62 causes the tubular sleeve 168 to move around the circumference of the hub 24 of the tool body 12 and contact the rearward surface of the wear washer 38 as shown in FIG. 12. As the tubular pusher member 62 continues to move downwardly, the tubular sleeve 168 will force the wear washer 38 over the sleeve 28 with the inwardly directed projection 48 aligned so as to engage both of the sides of the slot edges 30, 32. The downward movement of the tubular pusher member 62 stops when the wear washer 38 has been pushed to a position midway along the length of the sleeve 28 as best shown in FIG. 13. With the wear washer 38 forced around the central portion of the sleeve 28, the tool 10 has been fully assembled. The valve to the pneumatic cylinder 60 is then reversed causing the tubular pusher member 62 to move upwardly until it returns to the position shown in FIG. 10 where the rollers 140 will again engage the cylindrical lower end 162 of the tubular pusher member 62 allowing the clamping pins 148 to release their grip on the outer surfaces of the sleeve 28. When the pivot pins 148 are fully withdrawn from the sleeve 28, the ends of the pins 148 are spaced apart a distance that is greater than the diameter of the wear washer 38 or any other part of the assembled tool 10. The assembled tool 10 can then be removed from the holder 72 and the machine 52 is ready to assemble another tool.

While the present invention has been described with respect to a single embodiment, it will be appreciated that many modifications and variations may be made without departing from the true spirit and scope of the invention. It is therefore the intent of the appended claims to cover all such modifications and variations that wall within the spirit and scope of the invention.

What is claimed:

1. A machine for assembling an annular wear washer around a compressible sleeve wherein said wear washer has a central opening and a projection extending inward of said central opening and further has an alignment surface, and said compressible sleeve has a longitudinal slot and said compressible sleeve is fitted around a cylindrical shank of a rotatable tool wherein said cylindrical shank has a longitudinal axis and a distal end and wherein said rotatable tool has a tapered cutting end opposite said cylindrical shank, said machine comprising:
- a frame,
- a holder for retaining said tool with said shank retained against movement with respect to said frame,
- a pusher having a tubular portion, said tubular portion having a distal end, with an inner diameter greater than an outer diameter of said shank and said tubular portion having a longitudinal axis,
- said pusher retained on said frame with said longitudinal axis of said tubular portion coaxial with said longitudinal axis of said tool retained in said holder,
- a motor on said frame for moving said pusher towards said holder wherein said distal end of said tubular portion is moved from a first position spaced from said distal end of said cylindrical shank to a second position surrounding a portion of said shank and wherein a wear washer positioned around said distal end of said shank is forced around said sleeve as said distal end of said tubular portion is moved to said second position, and
- a first alignment member and a second alignment member on said frame,
- said first alignment member having a dimension less than a spacing between outer edges of said slot while said compressible sleeve is in an uncompressed position,
- said second alignment member engaging said alignment surface, wherein said wear washer is aligned with respect to said compressible sleeve.

2. The machine of claim 1 and further comprising
a pair of opposing moveable clamping members,
said clamping members radially moveable against opposing portions of an outer surface of said compressible sleeve for compressing said sleeve around said shank prior to said tubular portion moving said wear washer around said sleeve.

3. The machine of claim 2 wherein each of said clamping members is mounted on a pivot arm, and
said pusher has a cam surface,
a cam follower on said pivot arm, and
said clamping members are urged by said cam follower against said compressible sleeve.

4. The machine of claim 2 wherein
said clamping members are mounted on pivot arms,
said pusher has a cam surface, and
one of said pivot arms has a cam follower wherein said clamping members are urged against said outer surface as said cam follower moves with respect to said cam surface.

5. A machine for assembling an annular wear washer around a compressible sleeve wherein said compressible sleeve has a longitudinal slot and said compressible sleeve is fitted around a cylindrical shank of a rotatable tool wherein said cylindrical shank has a longitudinal axis and a distal end and wherein said rotatable tool has a tapered cutting end opposite said cylindrical shank, said machine comprising:
- a frame,
- a holder for retaining said tool with said shank retained against movement with respect to said frame,
- a pusher having a tubular portion, said tubular portion having a distal end, with an inner diameter greater than an outer diameter of said shank and said tubular portion having a longitudinal axis,
- said pusher retained on said frame with said longitudinal axis of said tubular portion coaxial with said longitudinal axis of said tool retained in said holder a motor on said frame for moving said pusher towards said holder wherein said distal end of said tubular portion is moved from a first portion spaced from said distal end of said cylindrical shank to a second position surrounding a portion of said shank and wherein a wear washer positioned around said distal end of said shank is forced around said sleeve as said distal end of said tubular portion is moved to said second position,
- an alignment prong moveably mounted on said frame,
- a portion of said alignment prong having a dimension less than a spacing between outer edges of said slot while said compressible sleeve is in an uncompressed condition, and
- said portion of said alignment prong moveable between a first position where said portion is between said outer edges while said sleeve is around said shank and said tool is in said holder and a second position where said portion is spaced from said outer edges.

6. The machine of claim 5 wherein
said wear washer has a central opening and a projection extending inward of said central opening and
said wear washer further has an outer surface that defines a cylinder,
said outer surface having a noncylindrical portion having a given relationship to said projection,
said machine further comprising
an alignment surface on said frame for contacting said noncircular portion and aligning said projection with respect to said slot.

7. A machine for assembling an annular wear washer around a compressible sleeve wherein said compressible sleeve has a longitudinal slot and said compressible sleeve is fitted around a cylindrical shank of a rotatable tool, wherein said cylindrical shank has a longitudinal axis and a distal end and wherein said rotatable tool has a tapered cutting end opposite said cylindrical shank, said machine comprising:
- a frame,
- a holder on said frame for retaining said tool with said shank retained against movement with respect to said frame,
- a pair of opposing moveable clamping members,
- said clamping members moveable against opposing portions of an outer surface of said compressible sleeve for compressing said sleeve around said shank,
- a pusher having a tubular portion for urging said annular wear ring around said sleeve while said sleeve is compressed,
- an alignment prong moveably mounted on said frame,
- a portion of said alignment prong having a dimension less than a spacing between outer edges of said slot while said compressible sleeve is in an uncompressed condition, and
- said portion of said alignment prong is moveable between a first position where said dimensional portion is between said outer edges while said sleeve is around said shank for aligning said sleeve with respect to said frame and said tool is in said holder and a second position where said portion is spaced from said outer edges.

8. The machine of claim 7 and further comprising a motor for urging said wear washer over said sleeve.

9. The machine of claim 7 and further comprising:
said pusher having a cam surface,
a cam follower on said clamping members, and
said clamping members are urged by said cam follower against said outer surface.

10. The machine of claim 9 wherein each of said clamping members is mounted on a pivot arm and said cam follower is on said pivot arm.

11. The machine of claim 7 wherein
said pusher has a cam surface, and
one of said clamping members has a cam follower wherein said clamping member is urged against said outer surface as said cam follower moves with respect to said cam surface.

12. The machine of claim 11 wherein said clamping member is mounted on a pivot arm and said cam follower is on said pivot arm.

13. The machine of claim 7 wherein
said wear washer has a central opening and a projection extending inward of said central opening and
said wear washer further has an outer surface that defines a cylinder,
said outer surface having a noncylindrical portion having a given relationship to said projection,
said machine further comprising
an alignment surface on said frame for contacting said noncylindrical portion and aligning said projection with respect to said slot.

14. A machine for assembling an annular wear washer around a compressible sleeve wherein said compressible sleeve has a longitudinal slot and said compressible sleeve is fitted around a cylindrical shank of a rotatable tool wherein said cylindrical shank has a longitudinal axis and a distal end and wherein said rotatable tool has a tapered cutting end opposite said cylindrical shank, said machine comprising:
a frame,
a holder on said frame for retaining said tool with said shank retained against movement with respect to said frame,
an alignment prong moveably mounted on said frame,
a portion of said alignment prong having a dimension less than a spacing between outer edges of said slot while said compressible sleeve is in an uncompressed condition, and
said portion of said alignment tab moveable between a first position where said dimensional portion is between said outer edges, while said sleeve is around said shank and said tool is in said holder and a second position where said portion is spaced from said outer edges.

15. The machine of claim 14 wherein
said wear washer has a central opening and a projection extending inward of said central opening and
said wear washer further has an outer surface that defines a cylinder,
said outer surface having a noncylindrical portion having a given relationship to said projection,
said machine further comprising
an alignment surface on said frame for contacting said noncircular portion and aligning said projection with respect to said slot.

16. The machine of claim 14 and further comprising
a pair of opposing moveable clamping members,
said clamping members radially moveable against opposing portions of an outer surface of said compressible sleeve for compressing said sleeve around said shank prior to said tubular portion urging said wear washer around said sleeve.

17. The machine of claim 16 wherein each of said clamping members is mounted on a pivot arm, and said machine further comprising:
a moveable pusher having
a cam surface,
a cam follower on said pivot arm, and
said clamping members are urged by said cam follower against said outer surface.

18. The machine of claim 16 wherein
said clamping members are mounted on pivot arms,
said pusher has a cam surface, and
one of said pivot arms has a cam follower wherein said clamping members are urged against said outer surface as said cam follower moves with respect to said cam surface.

* * * * *

UNITED STATES PATENT AND TRADEMARK OFFICE
CERTIFICATE OF CORRECTION

| | | |
|---|---|---|
| PATENT NO. | : 7,770,287 B1 | Page 1 of 1 |
| APPLICATION NO. | : 11/370685 | |
| DATED | : August 10, 2010 | |
| INVENTOR(S) | : Phillip A. Sollami | |

It is certified that error appears in the above-identified patent and that said Letters Patent is hereby corrected as shown below:

In column 5 line 6, delete "thereon" and insert --therein--

In column 6 line 56, after "that" delete "wall" and insert --fall--

In column 7 line 66, after "holder" insert --,--

Signed and Sealed this
Twenty-eighth Day of December, 2010

David J. Kappos
*Director of the United States Patent and Trademark Office*